United States Patent [19]

Nakagawa

[11] Patent Number: 5,001,827
[45] Date of Patent: Mar. 26, 1991

[54] TURRET PUNCH PRESS WITH A TAPPING FUNCTION

[75] Inventor: Hiroshi Nakagawa, Aichi, Japan

[73] Assignee: Nisshinbo Industries, Inc., Nihonbashi, Japan

[21] Appl. No.: 287,325

[22] Filed: Dec. 21, 1988

[30] Foreign Application Priority Data

Dec. 25, 1987 [JP] Japan .................................. 62-195990

[51] Int. Cl.$^5$ ........................... B23G 1/20; B23G 3/00
[52] U.S. Cl. .................................. 29/560; 10/129 A;
408/1 R; 408/30; 408/98; 408/132
[58] Field of Search ................. 29/560, 57; 10/129 R,
10/129 A, 136 R; 408/35, 30, 53, 56, 98, 125,
126, 128, 132, 137, 138, 1 R

[56] References Cited

U.S. PATENT DOCUMENTS

| | | | |
|---|---|---|---|
| 3,788,760 | 1/1974 | Daniels | 408/35 X |
| 4,706,369 | 11/1987 | Lavorel | 29/560 |
| 4,761,100 | 8/1988 | Maillard | 29/560 X |

Primary Examiner—Z. R. Bilinsky
Attorney, Agent, or Firm—Rogers & Killeen

[57] ABSTRACT

Disclosed is a turret punch press in which tap holder assemblies TA are incorporated into the press body through tool lifters. Each of the tap holder assemblies TA is composed of a tap holding mechanism, a tap feeding mechanism and a tabular workpiece clamping mechanism formed on the same axis. At the same time, transmission mechanisms DA for selectively transmitting the torque from the press body to the tap holding mechanisms are incorporated into the press body. With a punch press having this construction, tapping can be performed on the same axis as punching.

10 Claims, 8 Drawing Sheets

TURRET PUNCH PRESS WITH A TAPPING FUNCTION

BACKGROUND OF THE INVENTION

1. Field of the Invention

This invention relates to a turret punch press with a tapping function.

2. Description of the Prior Art

When forming a female screw by using a tapping process, it is common practice to first form a starting hole in the workpiece by means of a turret punch press or the like before performing the tapping with a tapping machine. However, since this is operationally inefficient, it has become common practice recently to adopt a method in which the tapping operation is performed using a tap 98 mounted on a motor 99 attached to an outer side section of the body MB of a turret punch press, as shown in FIG. 7.

Figure 8:
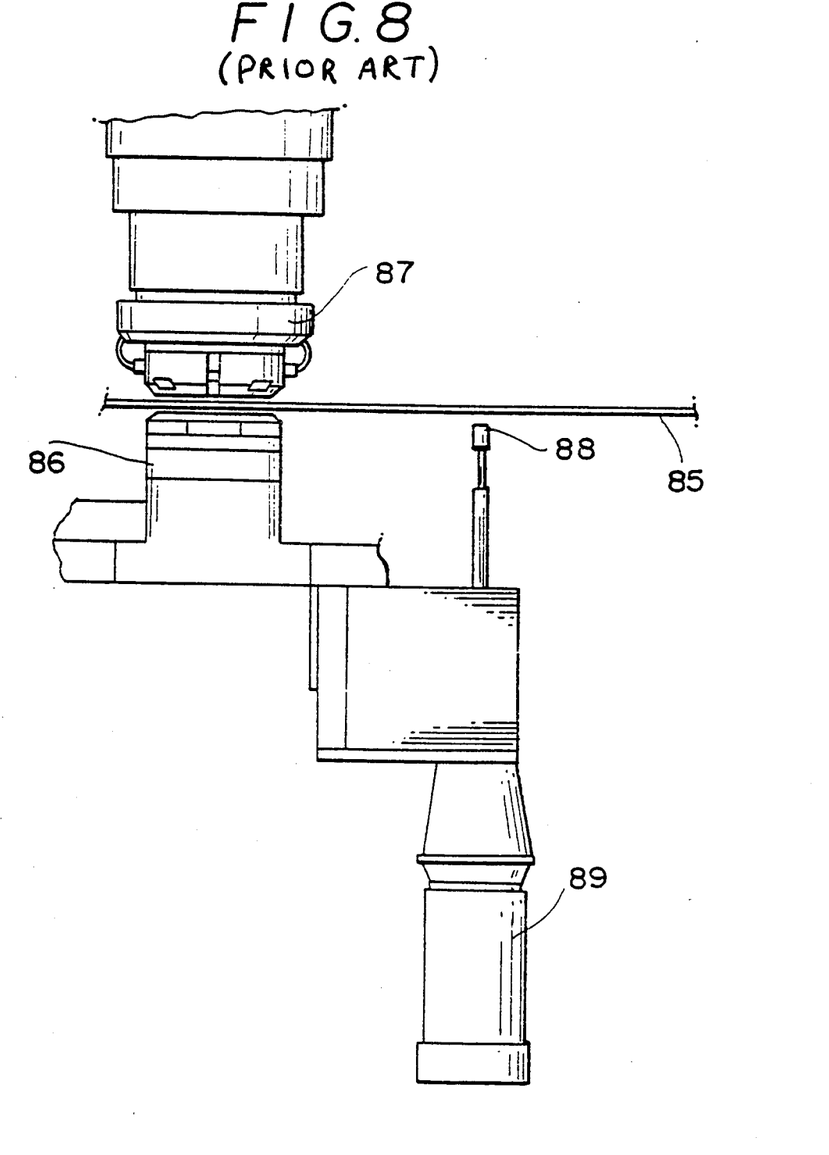
FIG. 8 shows a tapping device attached to a punch press which is not of the turret type.

In the case of a punch press which is not of the turret type, it is conventional practice to prepare an optional work set which is composed of a tapping motor 89 and a tap 88, as shown in FIG. 8. This optional work set is mounted on a punch press, tapping being performed on a starting hole which has been previously formed in a tabular workpiece 85 by means of a punch and a die respectively mounted on a punch holder 87 and a die holder 86.

Figure 7:
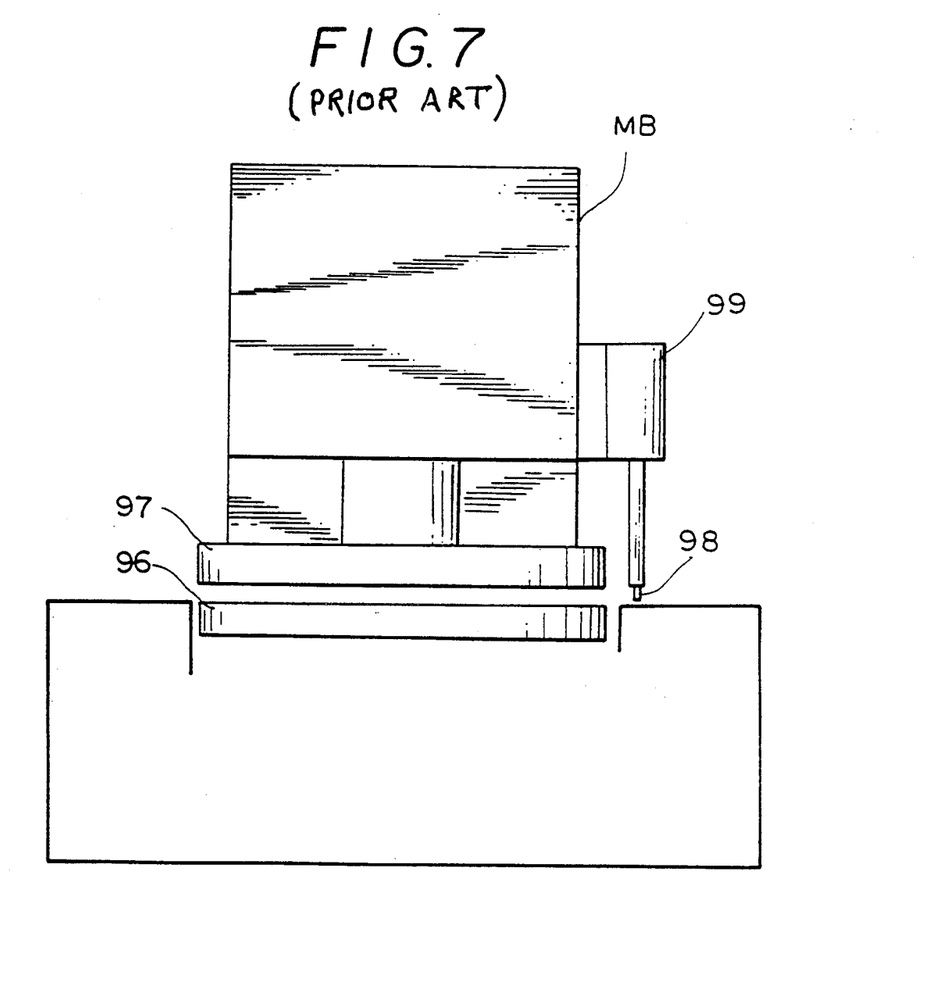
FIG. 7 is a schematic view of a conventional turret punch press to which a tapping function is added.
Figure 9:
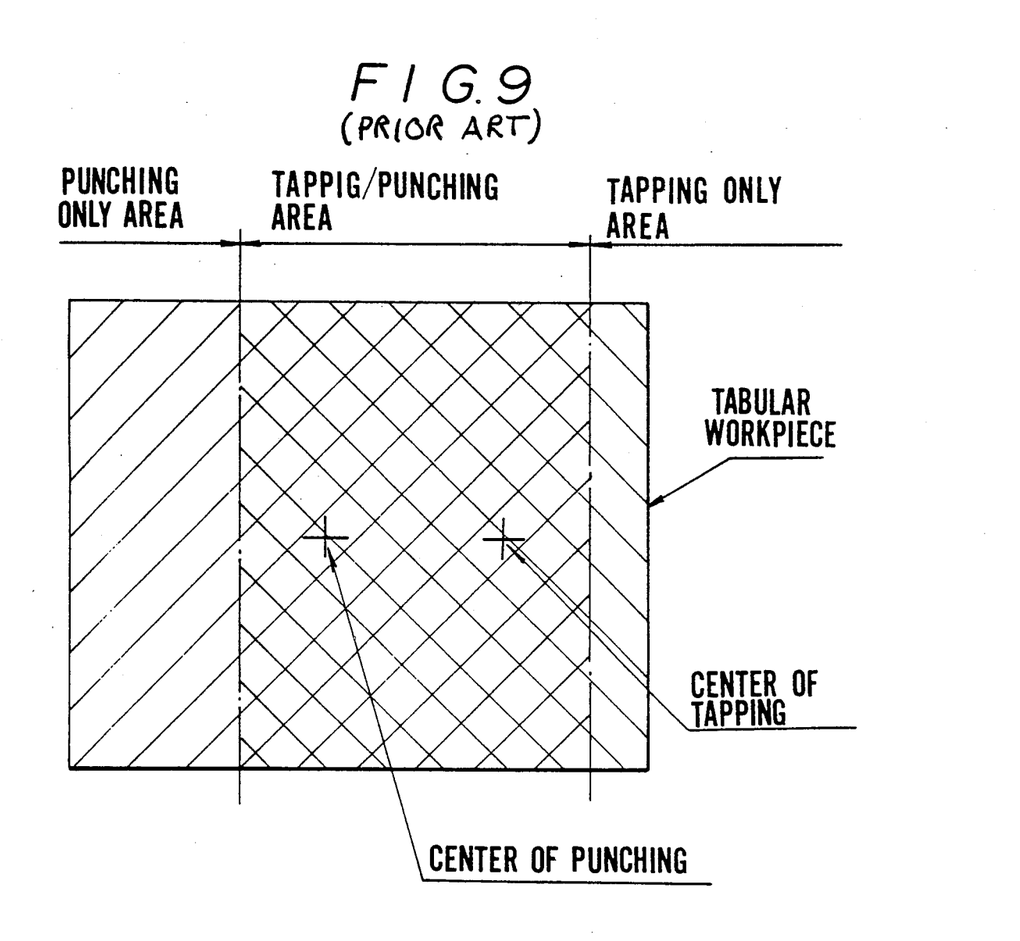
FIG. 9 shows the areas where punching and tapping can be performed when the center of tapping is misaligned with the center of punching.

In the conventional method shown in FIG. 7, however, the tapping operation is performed using a turret punch press, so that the tapping motor 99 and the tap 98 must be attached to the punch press at positions clear of the punch turret 97 and the die turret 96. As a result, the tapping motor 99 and the tap 98 are situated well away from the center of punching where the various punching operations such as blanking, boring and drawing are performed, and the workable range available with a single work clamping therefore has to be relatively narrow. It is to be noted that a tapping operation based on the conventional principle must be controlled on a software basis. However, the preparation of the required software is inevitably a rather troublesome task. Furthermore, even when the control is conducted on a software basis, the punching range is discordant with the tapping range, as shown in FIG. 9, since the punching axis is not aligned with the tapping axis, resulting in a reduced available range for working with a single work clamping.

The conventional method illustrated in FIG. 8, according to which the above-described optional work set is mounted on a punch press, does not provide satisfactory operational utility, either, since the central axes of the tapping motor 89 and the tap 88 are inevitably different from those of the punch holder 87 and the die holder 86.

Accordingly, it would be very convenient if a turret punch press could be developed in which punching and tapping can be conducted on one and the same axis.

SUMMARY OF THE INVENTION

It is accordingly an object of this invention to eliminate the above-mentioned problems in conventional turret punch presses. In accordance with this invention, there is provided a turret punch press comprising: a press body; tap holder assemblies which are incorporated into said press body in such a manner as to be arranged around the periphery of a circle with the punch holders of the punch turret, each of said tap holding assemblies being composed of a tap holding mechanism, a tap feeding mechanism and a tabular workpiece clamping mechanism; and transmission mechanisms incorporated into said press body and adapted to transmit the torque from said press body to the respective tap holding mechanisms of said tap holder assemblies; whereby tapping can be performed on the same axis as punching.

In a turret punch press in accordance with this invention, tap holder assemblies are incorporated into the die holders in a circular arrangement which shares a common circumference with the circular arrangement of the punch dies of the punch turret. At the same time, transmission mechanisms for transmitting the torque from the driving means provided in the press body to the above-mentioned tap holder assemblies are incorporated into the press body. Thanks to this arrangement, tapping can be performed on one and the same axis as punching, the operation which a punch press is originally designed to perform, thus eliminating the above-mentioned problems encountered in conventional punch presses.

DETAILED DESCRIPTION OF THE PREFERRED EMBODIMENTS

An embodiment of this invention will now be described with reference to the accompanying drawings.

Figure 1:
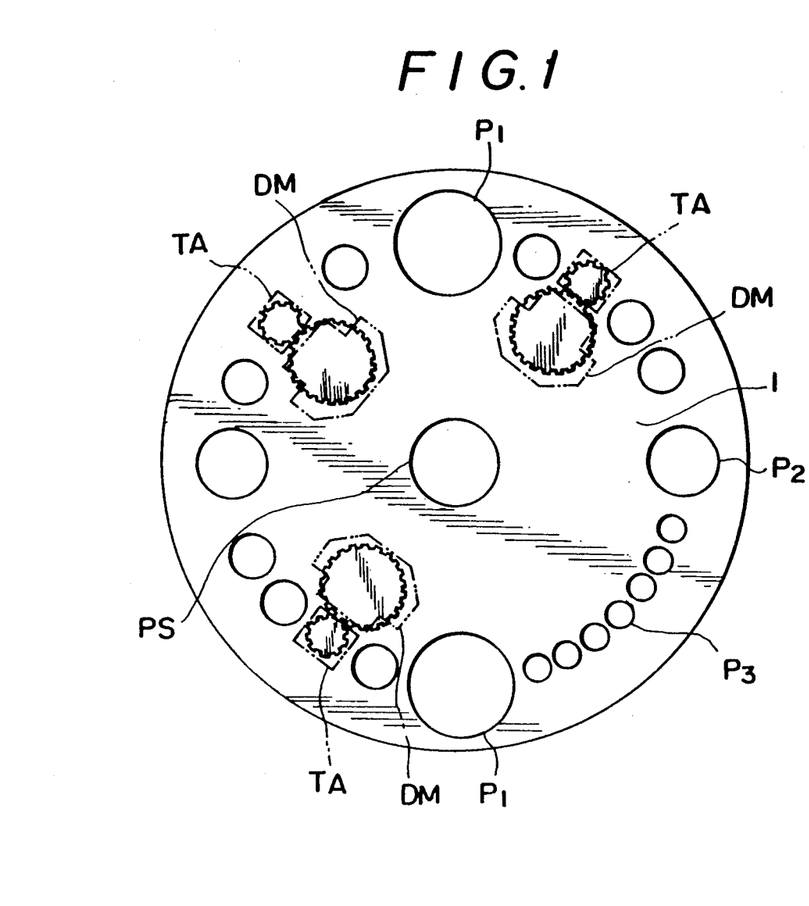
FIG. 1 is a plan view of an embodiment of this invention.

FIG. 1 is a top plan view of the punch turret section of a turret punch press constituting an embodiment of this invention in which three tap holder assemblies of this invention are incorporated. The punch turret section shown includes tap holder assemblies TA, torque transmission mechanisms DM, punch die holders P1, P2, P3, and a punch turret supporting shaft PS.

Figure 2:
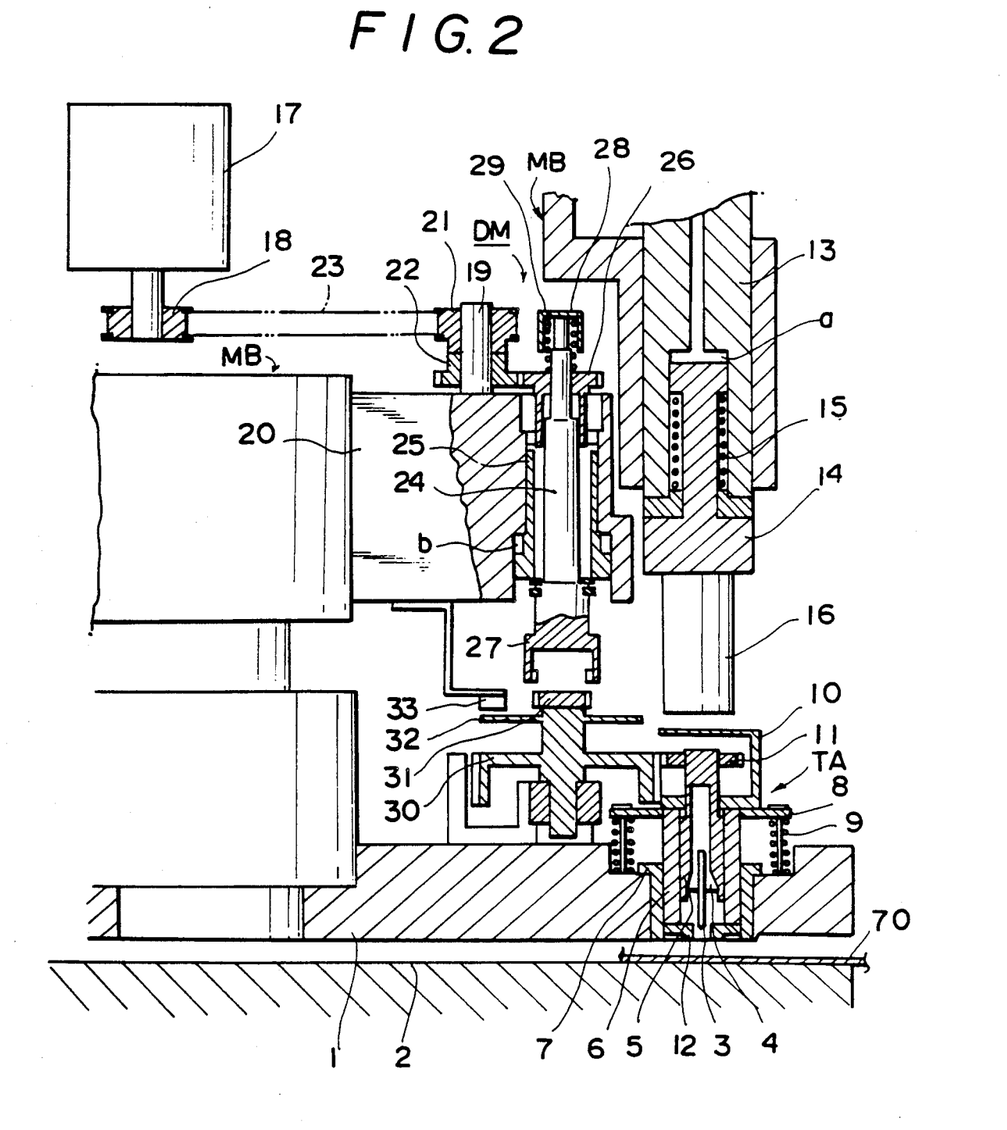
FIG. 2 is a sectional view showing the essential parts of the embodiment in the condition immediately before tapping is performed on a tabular workpiece which has already undergone punching.
Figure 3:
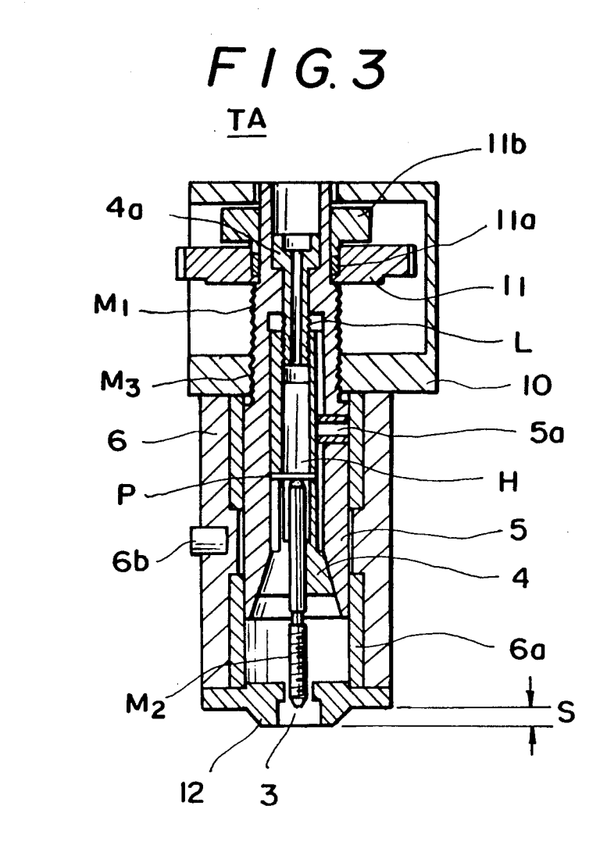
FIG. 3 is a sectional view showing the tap holder in detail.
Figure 4:
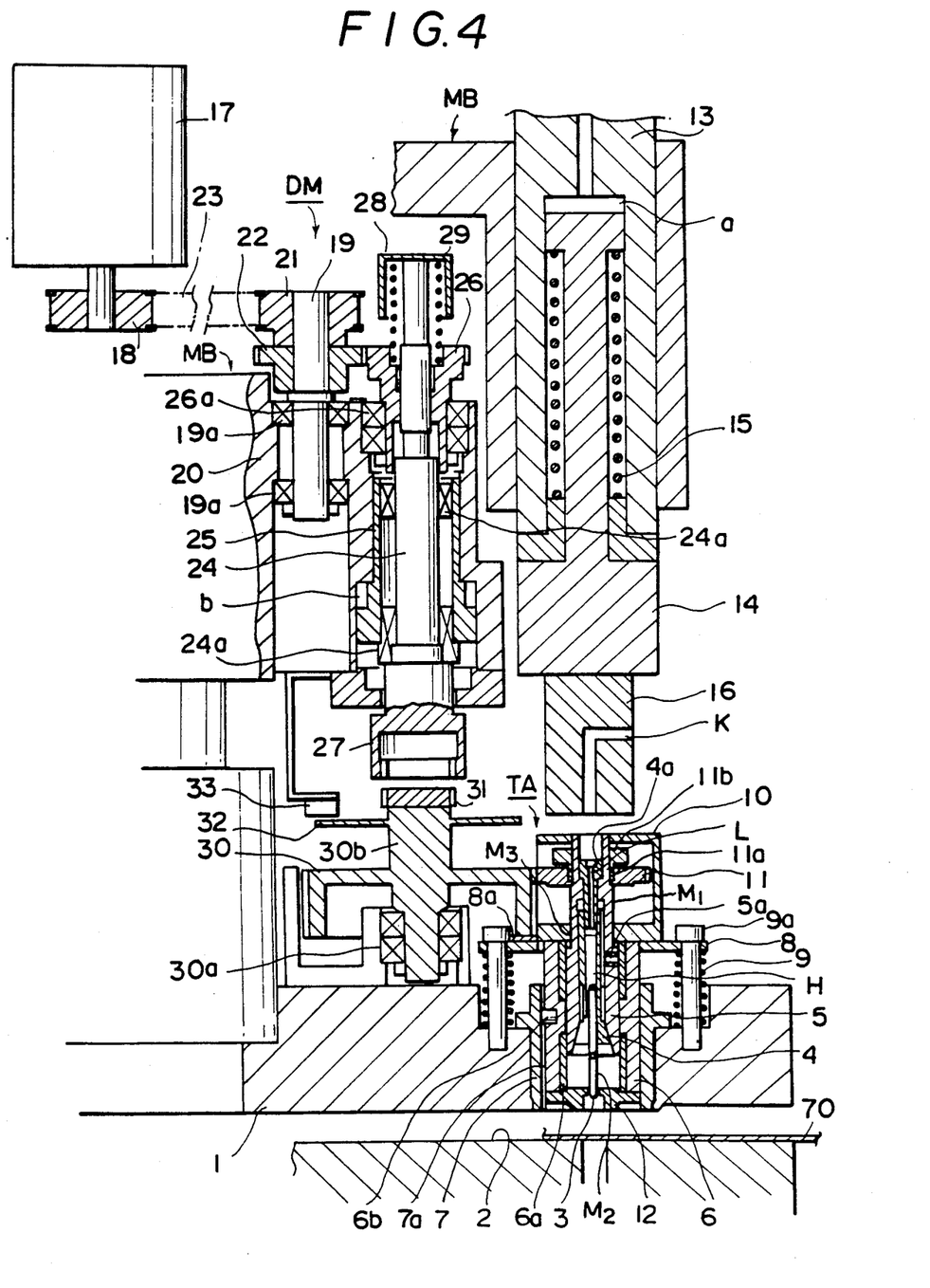
FIG. 4 is an enlarged sectional view of the parts shown in FIG. 2.

FIGS. 2 through 4 are sectional views showing the essential parts of the turret punch press of this invention.

The structure shown includes a punch turret 1, a die turret 2, a tap 3 attached to a collet chuck 4, a chuck holder 5 adapted to support the collet chuck 4 in a bore having the same axis, a holder guide 6 adapted to receive the chuck holder 5 and guide the same in such a manner that it is rotatable and vertically movable, a bushing 7 for receiving the holder guide 6, and a tabular lifter 8 to the upper surface of which is attached a brake pad 8a adapted to abut against a gear 30 to be described below. The structure shown further includes a spring 9 which is provided between the lifter 8 and the punch turret 1 in such a manner as to extend through an upright guide post 9a provided on the punch turret 1 and which is adapted to urge the lifter upwards, a gear case 10 the lower end surface of which is fixed to the holder guide 6 to be integral therewith and which is engaged with the chuck holder in the case of this embodiment, a gear 11 fixed to the upper end portion of the chuck holder 5 and arranged inside the gear case 10, and a tabular workpiece clamping member 12 fixed to the lower end surface of the holder guide 6 and adapted to support a tabular workpiece 70 on the die turret 2 during tapping. The components 3 through twelve form a tap holder assembly TA.

The tap holder in the above-mentioned tap holder assembly TA will now be described in detail with reference to FIG. 3.

As shown in FIG. 3, the collet chuck 4 on which the tap 3 is mounted is inserted through a hole formed in the holder 5. The head portion of the chuck 4 is fastened by a bolt 4a and is pressed into the holder 5 from below. At the same time, the chuck holder 5 is connected with the collet chuck 4 by means of a pin 5a in such a manner as to be fixed against rotation. Further, the chuck holder 5 is supported by the holder guide 6 through a guide metal 6a in such a manner as to be rotatable and vertically movable. On the other hand, the collet chuck 4 includes axial oil passages H and L extending through the bolt 4a, while reference character P indicates the pin of the collet chuck 4.

The holder guide 6 within which the guide metal 6a is provided has on its outer surface a pin 6b. This pin 6b is loosely received by a key way 7a formed in the bushing 7, so that the holder guide 6 is received by the bushing 7 in such a manner as to be fixed against rotation while being movable in the vertical direction. The bushing 7 is fitted into a holder formed in the punch turret 1 for the purpose of receiving the punch die holder.

Male and female screws M1 and M3 are respectively formed on the mating surface in the upper portion of the chuck holder 5 and that in the gear case 11 which is integral with the holder guide 6. These screws M1 and M3 have the same pitch as the screw M2 of the tap 3.

Figure 5:
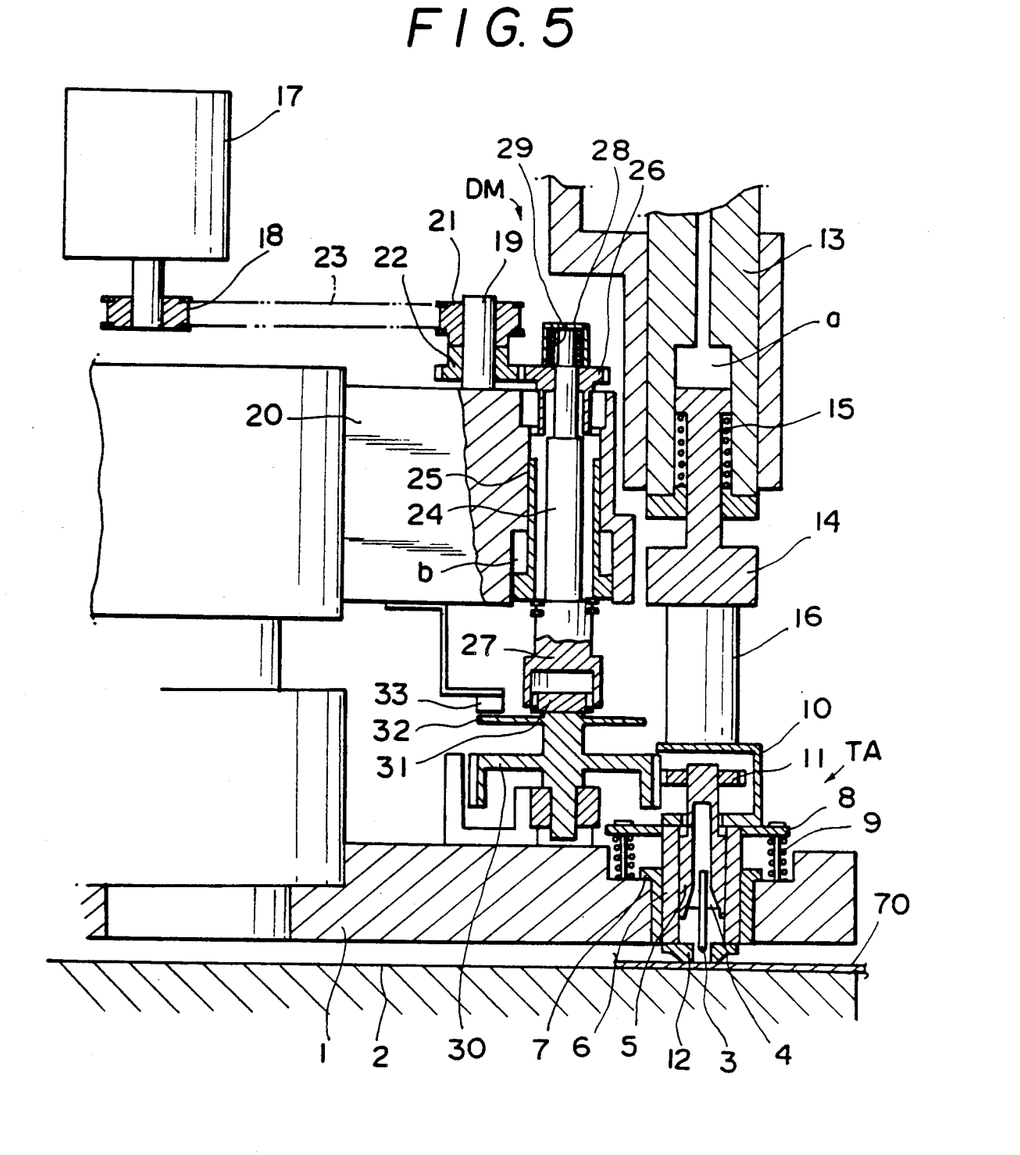
FIG. 5 shows the condition in which tapping can be performed by bringing the ram and the piston of the transmission mechanism down to the bottom dead center position and driving the motor.

Referring now to FIGS. 2 and 4, the structure shown further includes a ram cylinder 13 provided in the press body MB, a ram piston 14, a ram spring 15, and a ram head 16 connected integrally with the ram piston 14. The lower end surface of the ram head 16 is so arranged as to confront the upper surface of the gear case 10. When, in the condition shown in FIGS. 2 and 4, pressurized air is introduced into the space a of the ram cylinder 13, the piston 14 and the ram head 16 descend against the resiliency of the spring 15. The lower end surface of the ram head 16 then abuts against the upper surface of the gear case 10 and causes it to descend together with the holder guide 6. The piston 14 stops its descent when the tabular workpiece clamping member 12 abuts against the tabular workpiece 70, as shown in FIG. 5. The ram head 16 includes, as shown in FIG. 4, an oil passage K communicating with the oil passages H and L. This ram head 16 serves to apply pressurizing forces to a punch (not shown) during normal punching operation.

Still referring to FIGS. 2 and 4, the structure shown further includes a motor 17 provided in the press body MB, a pulley 18, an upright shaft 19 provided on a bracket 20 through the intermediary of a bearing 19a, a pulley 21 mounted on the upright shaft 19, a gear 22 mounted on the upright shaft 19, a belt 23 wound around the pulleys 18 and 21, a shaft 24 which is loosely received by a piston 25 through a bearing 24a and which is arranged in the bracket 20 to be integral with the piston 25 in such a manner as to be rotatable and get fixed in the vertical direction, a gear 26 which is engaged with the above-mentioned gear 22 and which is loosely received by the bracket 20 through a bearing 26a in such a manner as to be vertically movable along the upper section of the shaft 24, a clutch gear 27 fixed to the lower end of the shaft 24, a spring case 28 fixed to the upper end of the shaft 24, and a spring 29 which is provided between the case 28 and the gear 26 and which is adapted to urge the shaft 24 upwardly.

Referring to FIGS. 2 and 4, the structure shown further includes a gear 30 which is arranged on an upright shaft 30b provided within the punch holder through the intermediary of a bearing 30a. This gear 30 is larger than the gear 11 provided on the tap holder side and is engaged with the gear 11 above the tool lifter 8. When the tool lifter 8 is at the upper position, the lower surface of the gear 30 is pressed against the brake pad 8a provided on the upper surface of the lifter 8 by the force of the lifter spring 9, rotation thereof thereby being prevented. The reference numeral 31 indicates a gear which is provided at the upper end of the shaft of the gear 30 and which is engaged with the clutch gear 27 provided at the lower end of the shaft 24. The components referred to by the reference numerals 17 through 31 constitute a transmission mechanism for selectively transmitting torque to the gear 11 on the tap holder side. The reference numeral 32 indicates a dog provided in the upper section of the shaft 30b of the gear 30, and the reference numeral 32 a proximity switch mounted on the bracket 20.

When in the condition shown in FIGS. 2 and 4 pressurized air is introduced into the space b which is formed in the bracket 20 and into which the piston 25 is fitted, the piston 25 and the shaft 24 descend against the resiliency of the spring 29, causing the clutch gear 27 to be engaged with the gear 31, as shown in FIG. 5.

When in this condition the motor 17 is driven and its torque is transmitted through the pulleys 18, 21 and the gears 22, 26 to the shaft 24, causing the clutch gear 27, which is integral with the shaft 24, to rotate, whereby the gear 30, which is coaxially arranged with the gear 31 engaged with the clutch gear 27, is also made to rotate. This in return causes the gear 11 to rotate. As a result, the holder 5, the collet chuck 4 and the tap 3, all of which are integrally arranged with the gear 11, rotate together with the gear 11 inside the holder guide 6. Since the holder 5 is held in place in the gear case 10 by the screws M1 and M3, it descends, as a result of this rotation, while rotating within the holder guide 6, the tap 3 performing tapping on the tabular workpiece 70.

Since the screw M2 of the tap 3 has the same pitch as the screws M1 and M3, the chuck holder 5 descends within the holder guide 6 at the same rate as the descent of the tap 3 with respect to the tabular workpiece 70.

The operation of the press with the above construction will now be described.

FIGS. 2 and 4 show the condition in which tapping is about to start. In this condition, the lower end surface of the ram head 16 is separated from the upper surface of the gear case 10. The clutch 27 and the gear 31 are not engaged with each other. The tabular workpiece 70, in which a starting hole has been made in the previous punching process, is positioned beneath the tap holder assembly TA by rotating the turret 1.

When in this condition pressurized air is introduced into the space a of the ram cylinder 13 and the space b formed in the bracket 20, the ram head 16 and the shaft 24 descend as described above. As shown in FIG. 5, the ram piston 14 causes the tap holder assembly TA to make a quick descent together with the gear case 10 and the lifter 8. The tabular workpiece clamping member 12 then fastens the tabular workpiece 70 in place, the clutch gear 27 coming into engagement with the gear 31. When in this condition oil mist from an oil mist generator (not shown) is forced into the oil passage K formed in the ram head 16 to apply a certain amount of oil to the tap 3 and the upper surface of the tabular workpiece 70 through the oil passage L and H and the motor 17 is driven, the tapping operation is ready to be started.

Figure 6:
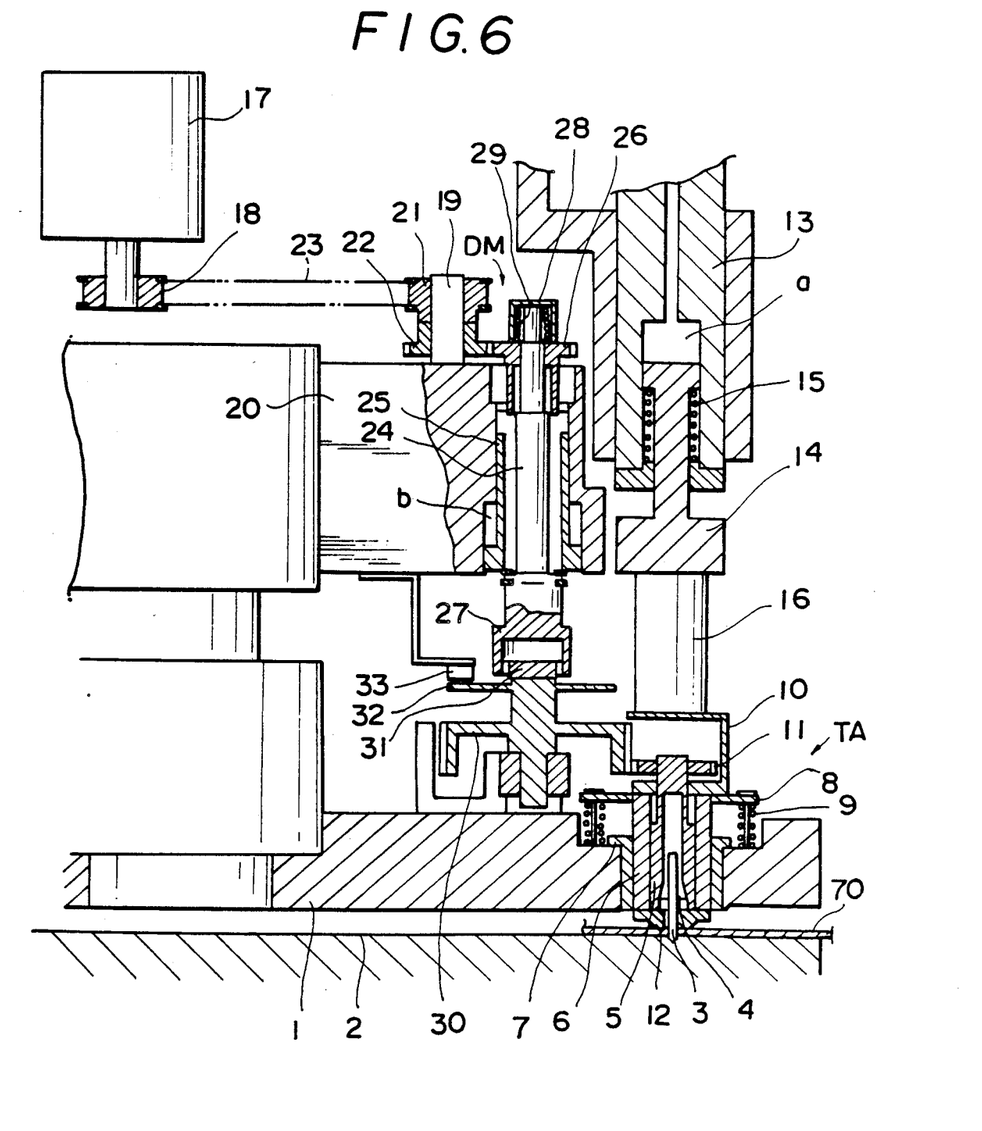
FIG. 6 shows the condition in which tapping is finished.

In this condition, the motor 17 is driven and its torque is transmitted to the tap holder assembly TA through the above-described transmission mechanism DM. The tap 3 then descends while rotating, thereby performing tapping on the tabular workpiece 70. When the tapping is finished, the condition shown in FIG. 6 is attained.

The rotation amount of the gear 11 for tapping is determined, in the condition in which the tap holder assembly is at its bottom end position, in accordance with the relation between the pitch of the screw M2 of the tap 3 and the distances from the lower end surface of the tabular workpiece clamping member 12 to the lower end surface of the tap 3. The rotation amount of the gear 11 is detected by detecting the rotation amount of the gear 30 through the correlative action of the dog 32 and the proximity switch 33, based on the gear ratio between the gears 11 and 30.

When the tapping operation has been finished, the motor 17 is rotated in the reverse direction and in the same amount as in lowering the tap so as to separate the tap 3 from the tabular workpiece 70, thus attaining the condition shown in FIG. 5. The supply of pressurized air to the cylinder spaces a and b is then stopped to remove the air pressure. This causes the ram head 16 and the ram piston 14 to be raised upwardly by the compressive force of the spring 15. The lower end surface of the ram head 16 is separated from the upper surface of the gear case 10, and the tapping assembly is raised upwardly by the ascent of the lifter 8 caused by the resilience of the spring 9, thus attaining the condition of FIG. 2 again. On the other hand, the shaft 24 is raised by the resilience of the spring 29 to release the engagement between the clutch gear 27 and the gear 31, thus attaining the condition of FIGS. 2 and 4 again.

When tapping is to be continued using the same tap 3, the tabular workpiece 70 is positioned in place at a new working position, pressurized air being supplied to the space a so as to perform the next tapping operation. When tapping is not to be performed using the same tap 3, the air in the space a is evacuated, the tap holder assembly being returned to the original position by being raised together with the tool lifter 8. At the same time, the air in the cylinder space b is also evacuated, the shaft 24 being raised by the resiliency of the spring 28 to release the engagement between the gears 30 and 11.

The rest of the operation may be performed in the same manner as with conventional turret punch presses.

As described above, the turret punch press of this invention makes it possible to perform tapping and punching on one and the same axis of the same ram head, so that the range of tapping is not different from that of punching at all. Accordingly, the operator can regard tapping as the same kind of work as other punching operations, which means he can perform tapping more efficiently than with conventional punch presses.

Thus, the punch press of this invention makes it possible to perform punching and tapping on one and the same axis of the same ram head on a punch turret, so that it does not involve any errors in terms of working positions which would be encountered in conventional punch presses in which punching and tapping are performed with different working machines. Further, it is advantageous in that the installation space is reduced because the two operations can be performed with the same machine.

Furthermore, it involves no deterioration in working efficiency even when both punching and tapping have to be performed on one and the same tabular workpiece.

In addition, since the tap holder of this invention allows the use of holes for conventional punch dies, a plurality of tap holders with different sizes can be mounted on one and the same punch turret. Accordingly, various types of punching and tapping can be conducted with one and the same machine.

Further, since the tabular workpiece clamping member of this invention is so designed as to fasten a tabular workpiece in place at the outer periphery of the tap, workpiece lift, which would otherwise be apt to occur when separating the tap from the workpiece after working, can be effectively avoided. This arrangement facilitates the tap separating operation. Further, it helps to prevent lubricant from being dispersed during working.

In the above-described embodiment, an encoder or the like may be provided instead of the dog 32 and the proximity switch 33 for the purpose of counting the output pulses thereof. Further, it will be possible to provide, instead of the brake pad 8a, a pin or the like on the tool lifter 8 and to make it engage with the lower surface of the gear 30 as the means for fixing it against rotation. In the case of a hydraulic press, the means for lowering the tap holder may be a stamping cylinder.

Further, the screws M1 and M3 may be formed on the chuck holder 5 and the holder guide 6.

What is claimed is:

1. A turret punch press comprising: a press body; tap holder assemblies which are incorporated into said press body in such a manner as to be arranged around the periphery of a circle with the punch holders of the punch turret, each of said tap holding assemblies being composed of a tap holding mechanism, a tap feeding mechanism and a tabular workpiece clamping mechanism; and transmission mechanisms incorporated into said press body and adapted to transmit the torque from said press body to the respective tap holding mechanisms of said tap holder assemblies; whereby tapping can be performed on the same axis as punching.

2. A tap holder assembly to be used in a punch press as claimed in claim 1, said tap holder assembly comprising: a tap holder which is composed of a tap feeding mechanism and a tabular workpiece clamping mechanism and which is attached to the punch holder hole of the punch turret by being passed through a tabular tool lifter and held therein in such a manner as to be fixed against rotation and vertically movable; a transmission mechanism provided on the press body side and adapted to selectively transmit the torque from the press body to the input section of the tap feeding mechanism; and a holder rotation preventing mechanism adapted to apply the lifting force available at the time of lifting said tool lifter to the output gear of said torque transmission mechanisms through such member as a brake pad or a pin, thereby making it possible to perform tapping on the same axis as punching and to keep the tap holder from rotating when no tapping is to be performed.

3. A tap holder to be used in a punch press as claimed in claim 1, said tap holder comprising: a collet chuck holding a tap in the center hole thereof; a chuck holder receiving said collet chuck in a hole on the same axis therewith and adapted to rotate together with said collet chuck, said chuck holder including a male screw section having the same pitch as the screw of said tap as well as an input gear formed above said male screw section; a holder guide adapted to hold said chuck holder in such a manner that it is rotatable and vertically movable and having a female screw section adapted to engage with the male screw formed on the outer periphery of said chuck holder; and a tabular workpiece clamping member fixed to the lower surface of said holder guide and having a tap passing hole formed in the central section thereof.

4. A tap holder to be used in a punch press as claimed in claim 2 said tap holder comprising: a collet chuck holding a tap in the center hole thereof; a chuck holder receiving said collet chuck in a hole on the same axis therewith and adapted to rotate together with said collet chuck, said chuck holder including a male screw section having the same pitch as the screw of said tap as well as an input gear formed above said male screw section; a holder guide adapted to hold said chuck holder in such a manner that it is rotatable and vertically movable and having a female screw section adapted to engage with the male screw formed on the outer periphery of said chuck holder; and a tabular workpiece clamping member fixed to the lower surface of said holder guide and having a tap passing hole formed in the central section thereof.

5. A turret punch press for selectably punching and tapping a workpiece positioned on said press comprising:
    (a) a press body;
    (b) a punch turret rotatably carried by said pres body and adapted to receive one or more taps and one or more punches;
    (c) ram means for impelling the taps and the punches axially toward the workpiece;
    (d) positioning means for selectably positioning the taps and the punches to enable operation of the ram means;
    (e) a motor carried by said press body for rotating the taps; and
    (f) transmission means for transmitting torque from said motor to the selectably positioned one of the taps so that the selectably positioned tap is rotatably and axially moved through the workpiece.

6. The press as defined in claim 5 wherein said transmission means further comprises a clutch for engaging and disengaging said motor and the selectably positioned tap.

7. The press as defined in claim 5 further comprising clamping means for holding the workpiece when the tap is being rotated, said clamping means being positioned to hold the workpiece by said ram means.

8. In a turret punch press having means for selecting taps and punches in a rotatably punch turret carried by a press body, the selected tap being rotatably and axially moved through a workpiece, the improvement comprising:
    (a) a motor carried by said press body for rotating the taps; and
    (b) transmission means carried by said press body and by said punch turret for transmitting torque from said motor to the selected one of the taps,
    said transmission means comprising a clutch for disengaging said motor from said taps when said punch turret is rotated.

9. A method of tapping in a turret punch press having a rotatable punch turret carried by a press body, said punch turret having selectable taps and punches, comprising the steps of:
    (a) selectably positioning a tap adjacent a workpiece;
    (b) transmitting torque from a motor to a clutch, both being carried by said press body;
    (c) engaging said clutch so that torque is transmitted to the positioned tap;
    (d) operating said motor so that the positioned tap is rotatably and axially moved through the workpiece; and
    (e) disengaging said clutch so that said punch turret may be rotated.

10. The method as defined in claim 9 further comprising the steps of impelling a clamp for holding the workpiece toward the workpiece with a ram carried by said press body.

* * * * *